Oct. 12, 1971  P. FLORJANCIC  3,611,502
HIGH PRESSURE RAPID ACTING CLOSURE APPARATUS
FOR INJECTION MOLDING AND THE LIKE
Filed April 27, 1970

INVENTOR
PETER FLORJANCIC
ATTORNEYS
Robertson, Bryan, Parmelee & Johnson

United States Patent Office 3,611,502
Patented Oct. 12, 1971

3,611,502
HIGH PRESSURE RAPID ACTING CLOSURE APPARATUS FOR INJECTION MOLDING AND THE LIKE
Peter Florjancic, St. Martinstr. 12, Garmisch-Partenkirchen, Germany
Filed Apr. 27, 1970, Ser. No. 32,166
Claims priority, application Austria, Apr. 28, 1969, A 4,081/69
Int. Cl. B29f *1/00;* B30b *1/18*
U.S. Cl. 18—30 LV                                         10 Claims

ABSTRACT OF THE DISCLOSURE

A high pressure rapid acting closure apparatus for injection molding applications and the like is described. A closure member for high pressure working in a working region such as an injection mold is reciprocatingly mounted to a frame. The closure member is reciprocated with a lead screw and associated nut. The screw thread effective between the lead screw and nut is apportioned into a high speed, low frictional section for predetermined portion of the reciprocating stroke and a high axial strength bearing enhanced frictional section operative for the remainder of the stroke. High pressure operation is effected when the second high axial strength portion of the screw thread is effective between the nut and lead screw. The closure apparatus may be operated at high speeds with little heating.

---

Figure 1:
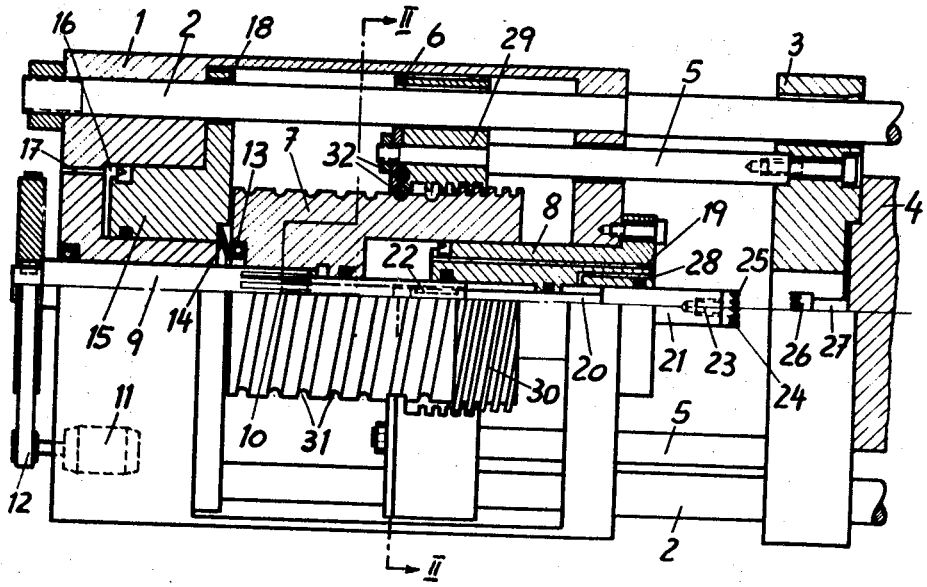

This invention relates to an apparatus for reciprocating a closure member relative to a working region for high pressure sealing such as in injection molding devices and the like. More specifically this invention relates to a closure apparatus wherein a lead screw and associated nut are operated to reciprocate a closure member.

In conventional machines utilizing a level screw and a nut for reciprocating a closure member, the screw is affixed to the closure member. The stationary screw is acted upon by a nut rotatably mounted to a frame and secured against axial displacement. Closure and opening of the closure member and any mold parts connected thereto is obtained by controlling rotation of the nut. A drive motor coupled to rotate the nut is disconnected therefrom when the closure member has reached the working region where a high pressure force such as from a hydraulic actuated piston is applied to through the nut to the lead screw to effect high pressure working of the closure member.

The described conventional closure apparatus transmits the high working force through the screw threads between the lead screw and nut. The entire screw thread is designed to bear the high axial force. The high axial strength bearing capability of the screw thread is customarily accompanied with large frictional forces resulting in significant undesirable heating of the screw threads during high reciprocating operating speeds. Heating of the screw threads is reduced by correspondingly reducing equipment operating speeds with a resulting loss of production efficiency.

It is an object of the invention to provide a closure apparatus with enhanced speed of operation without accompanying heat problems.

In a closure apparatus in accordance with the invention enhanced speeds of operation are obtained by providing a reciprocating device formed of a rotating component and a sliding component wherein different screw threads of complementary utility are employed. A first axial section of the screw thread operative between the components is formed of a high speed low friction design and extends axially for a predetermined portion of the reciprocating stroke of the closure member. A second screw thread section is operative during the remainder of the stroke when the closure member is in the vicinity of the working region. The second screw thread section is of high axial bearing strength capability with sufficient friction to brake the rapidly moving closure member to a stop at the desired location in the working region.

The distribution of the screw thread into a low friction low heat producing section and a high axial strength bearing section significantly enhances the operating speed. The high strength bearing section is used on a partial interrupted basis with a corresponding reduction of heating problems.

In a described embodiment in accordance with the invention the first screw thread section is formed of a helical groove sized to receive anti-friction elements operative between a slidably mounted nut and a rotating lead screw. The anti-friction elements allow the closure member to rapidly move towards and away from the working region with relatively small axial load bearing capability. When the closure member approaches the working region a second high axial force bearing screw thread section becomes operative between the lead screw and nut. This latter section is of the same pitch as the first section for smooth operational transition between the thread sections. A multiple of screw threads in the second section are meshed with one another at the time the closure member has reached the working region.

An advantage of the closure apparatus of this invention resides in that the lower frictional advance of the closure member provided by the first screw section enables the reciprocating drive motor to be of reduced power and size.

Figure 2:
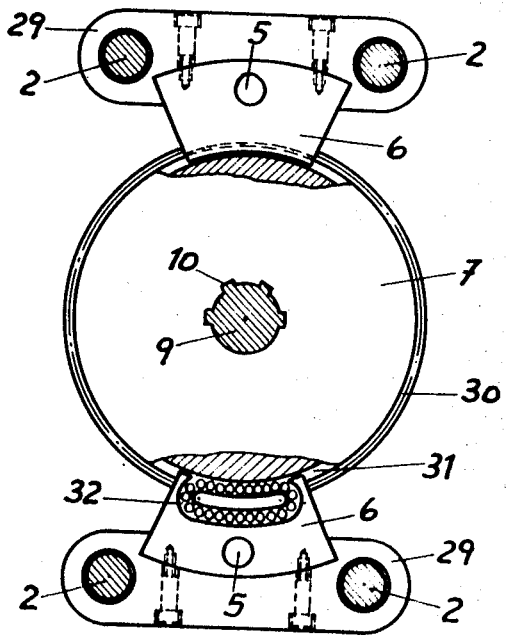

Other advantages and objects of the invention may be understood from the following descritpion of an embodiment in conjunction with the drawings wherein FIG. 1 is a partial longitudinal section of a closure apparatus in accordance with the invention;

FIG. 2 is an enlarged section view of the closure apparatus of this invention taken along the line II—II in FIG. 1.

With reference to FIG. 1 a machine frame 1 is provided with four guiding slide shafts 2 extending parallel with one another and the reciprocating axis of the machine. A closure member 3 in the form of a plate is slidingly mounted to slide shafts 2. Closure plate 3 carries a movable mold form part 4 (partially shown) and is connected to a nut 6 with connecting rods 5.

Closure plate 3 and its mold part 4 are reciprocated along slide shafts 2 towards and away from a working region (not shown) by a lead screw 7 and an associated nut 6. Nut 6 is mounted for axial movement to slide shafts 2 and operatively engages the lead screw 7 with anti-friction elements 32 and a screw thread 30. Lead screw 7 is mounted for rotation with a drive shaft 9 to which screw 7 is connected with splines 10. Splines 10 are axially aligned so that lead screw 7 may reciprocate relative to drive shaft 9. Rotation of drive shaft 9 is obtained by a motor 11 coupled by a belt 12 to shaft 9. Hence, depending upon the direction of rotation of lead screw 7 by the motor 11, nut 6 is either advanced towards or retracted from the high pressure working region.

Lead screw 7 axially bears at one axial side on a hydraulically actuated piston 15 through a bearing 13 and a plate spring 14 and on the opposite axial side screw 7 is axially slidingly supported by a bushing 8. Piston 15 is seated in a frame mounted cylinder 16 which may be hydraulically pressurized through a port 17. Pressurization of cylinder 16 advances piston 15 to closure member 3 for high pressure working thereof at the working region. Return of piston 15 is obtained by supplying pressurized hydraulic fluid to a port 19 in bushing 8. Port 19 communicates with a cylinder formed by an axial bore in screw 7 and bounded by shaft 9 and bushing 8. Piston 15 is provided with an annular radially outwardly extending flange 18 sized to slidingly engage shaft 2 and lock the piston 15 against rotation.

The screw thread used to operatively interconnect lead screw 7 to nut 6 is formed of two sections. Nut 6 is formed of two half circular portions each of which is inserted to a cross member 29 slidingly mounted to slide shafts 2.

The first screw thread section is formed of a semicircular helical groove 31 recessed about the circumference of lead screw 7 and extends axially for a predetermined distance selected to reciprocate closure plate 3 to and from its working region. A ball bearing 32 is mounted in each nut portion to ride in helical groove 31 for low frictional high speed advance of closure plate 3.

The second screw thread section is located closest to closure plate 3 and is formed of sturdy high axial force bearing threads 30. The second thread section 30 is rectangularly shaped and is raised above the surface of the lead screw to enable the nut 6 to engage the high axial force bearing thread when closure plate 3 is in the vicinity of the working region.

Bushing 8 is provided with a cylinder bore 20 to which hydraulic fluid may be supplied through port 28 and is coaxial with the shaft 9. A bolt 21, acting as a piston, is mounted in cylinder bore 20 and provided with a wedge 22 facing shaft 9. The bolt 21 does not rotate with shaft 9, but is driven in reciprocating maner by shaft 9 as the latter's rotation acts against wedge 22. The other end of bolt 21 facing closure member 3 is provided with a topped axially extending bore 23 into which a vibration plug 24 is screwed. Plug 24 has sawtooth shaped elevations 25 facing a correspondingly shaped counter plug 26 mounted on an ejector 27 bearing on mold part 4. When pressurized hydraulic fluid is supplied to the bore 20 through port 28, bolt 21 is actuated to axially eject an article formed with mold part 4.

In the operation of the described closure apparatus the mold, with which closure plate 3 operates, is closed by rotating screw 7 counterclockwise as viewed from motor 11. This rotation causes the ball bearings such as 32 to rapidly move along the helical groove 31 until the high force bearing threads 30 on the nut and lead screw engage one another.

The limited axial force needed to reciprocate closure member for the first predetermined stroke length controlled by helical groove 31 is readily borne by the ball bearing 32. The low friction drive provided by the ball bearing allows high operating speeds with little heating. Note that the plate spring 14 keeps the screw 7 and piston 15 from one another.

Towards the end of the closure motion, threads 30 become engaged and friction increases to commence braking rotation of screw 7 and axial motion of closure plate 3. When the mold is practically closed by form part 4, piston 15 is actuated by hydraulic fluid applied to port 17, thereby tightening plate spring 14 against screw 7. Any residual rotational motion screw 7 is fully braked at this time.

Pressurization of port 17 produces a high axial pressure force onto screw 7 and is transmitted to closure plate 3 via the high strength thread 30, nut 6 and connecting rods 5. The high friction of screw thread 30 prevents rotation of screw 7 during the high pressure molding operation in the working region.

After the mold operation, hydraulic pressure at port 17 is removed and applied to port 19 to drive screw 7 and thus also piston 15 back to the latter's retracted position. Motor 11 is operated reversely to rotate screw 7 clockwise and retract nut 6 to open the mold. A single turn of screw 7 will suffice to disengage closure plate 3 from its mold.

While the mold is opened, bolt 21 is rotated by action of shaft 9 on wedge 22. At the same time pressurized fluid is applied to port 28 to press bolt 21 against ejector 27. The heaving and back sliding action of teeth 25 of vibration plug 24 on counter plug 26 causes ejector to axially move for release of articles located in the mold.

A threaded mold part may be screwed into bolt 21, and become automatically unscrewed from the molded article with a resultant elimination of an ejecting drive for this motion. An alternative to the single tapped hole 23 is a gear which may be located on closure plate 3 to engage several bolts 21. A slip clutch may be operatively coupled to bolt 21 in the event limited axial ejecting movement of the form part 4 is sufficient. Hydraulic movement of bolt 21 may be replaced with an axially operated spring which during the injection phase will push the threaded mold into the correct position.

Within the scope of the invention many variations of the described embodiment may be made. For instance, nut 6 may be provided with a continuous identical screw thread 30 while the lead screw thread is partially and largely removed over the predetermined stroke length for low friction advance of closure plate 3. Nut 6 may be provided with two axially adjacent parts carrying different screw threads. Nut 6 may be used as the rotated element while screw 7 is axially movable to reciprocate the closure member. The high axial force producing device may be mechanically actuated.

What is claimed is:

1. An apparatus for high speed reciprocating motion of a closure member for high pressure working in a working region such as in injection molding and the like comprising a frame oriented to face the working region and a closure member slidingly mounted to the frame for reciprocation to and from the working region along a reciprocating axis, means producing a high pressure force for high pressure actuation of the closure member at the working region, a reciprocating actuator formed of a rotating component meshing with a sliding component oriented to reciprocate the closure member, said reciprocating actuator being operative between the high force producing means and the closure member, said rotating and sliding components acting upon one another through a screw thread formed of first and second sections, a first section of said screw thread being selected to provide low friction high speed advance of the closure member for a reciprocating stroke distance commensurate with the axial length of the first screw thread section, said second screw thread section being selected to provide the remainder of the closure member reciprocating stroke operative in the vicinity of the high pressure working region, said second screw thread section being formed of a high axial load bearing screw thread with enhanced frictional characteristics, and means for rotating the rotating component of the reciprocating device for reciprocation of the closure member.

2. The closure apparatus as claimed in claim 1 and further including anti-friction elements operatively located between the rotating and sliding components over the first screw thread section for low friction reciprocation of the closure member.

3. The closure apparatus as claimed in claim 2 wherein the force producing means is operative along said reciprocating axis against the rotating component.

4. The closure apparatus as claimed in claim 3 wherein the force producing means is formed of an annular cylinder mounted to the frame and an annular piston operatively located in the cylinder, said piston acting against one axial side of the rotating component and means operative against the other axial side of the rotating component to retract the piston upon completion of the high pressure working in the working region.

5. The closure apparatus as claimed in claim 4 wherein said rotating means includes a drive shaft coaxially mounted with the cylinder and piston to rotate the rotating component, said rotating component being rotatably captured with the drive shaft and axially movable therewith for retraction of said piston.

6. The closure apparatus as claimed in claim 5 wherein said rotating component comprises a lead screw and said sliding component comprises a nut operatively associated with the lead screw.

7. An apparatus for reciprocating a closure member relative to a working region for high pressure working such as encountered in injection molding devices and the like comprising a frame and a closure member slidingly mounted to the frame for reciprocal motion relative to the working region along a reciprocating axis, means producing a high pressure force for high pressure working of the closure member at the working region, an advancing device formed of a lead screw component and associated nut component operatively interconnecting the force producing means to the closure member, means for rotating an advancing device component to cause the nut and lead screw to rotate relative to one another for reciprocation of the closure member, means producing low frictional engagement between the nut and lead screw for a predetermined portion of the closure member reciprocating stroke towards and away from the working region, and means producing relatively higher frictional contact between the nut and lead screw with enlarged axial force bearing strength for the remaining portion of the closure member reciprocating stroke whereby the high pressure force producing means supplies high pressure working of the closure member at the working region through the nut and lead screw and the enlarged axial force bearing strength producing means.

8. The apparatus for reciprocating the closure member as claimed in claim 7 wherein said advancing device provided with a helical groove extending axially for a length commensurate with the predetermined portion of the closure member stroke and anti-friction elements mounted to the advancing device and located for movement in the helical groove to advance the closure member with low friction and wherein said lead screw and nut are provided with meshing screw thread sections extending axially to provide the advance of the closure member for the remainder of the stroke, said screw thread sections being selected to provide enhanced axial bearing strength sufficient for transferring the high pressure from the force producing means to the closure member.

9. The apparatus for reciprocating the closure member as claimed in claim 8 wherein one of said advancing device components is rotationally mounted to the frame about a rotational axis coaxial with the reciprocating axis and operatively connected to said rotation producing means, and means coaxially mounted with said rotating component and axially movable with respect thereto for article ejecting actuation of said closure member in the working region.

10. The closure apparatus as claimed in claim 8 wherein said high force producing means and the rotating component of the reciprocating device are axially movably mounted to the frame and to one another, and means for applying a returning force onto the rotating component to retract the high force producing means.

References Cited
UNITED STATES PATENTS

| | | | |
|---|---|---|---|
| 2,498,264 | 2/1950 | Goldhard | 18—30 LVUX |
| 3,044,389 | 7/1962 | Rexford | 18—16 CX |
| 3,121,919 | 2/1964 | Turner | 18—16 CUX |
| 3,191,235 | 6/1965 | Rougement | 18—30 LVX |
| 3,346,925 | 10/1967 | Maier | 18—30 LA |
| 3,375,757 | 4/1968 | Florjancic | 18—30 LUX |

FOREIGN PATENTS

| | | | |
|---|---|---|---|
| 1,404,585 | 5/1965 | France | 18—30 LV |

J. HOWARD FLINT, JR., Primary Examiner